US008102960B2

(12) United States Patent
Ran et al.

(10) Patent No.: US 8,102,960 B2
(45) Date of Patent: Jan. 24, 2012

(54) ADAPTATION OF A DIGITAL RECEIVER

(75) Inventors: Adee Ran, Maayan Baruch (IL); Ehud Shoor, Haifa (IL); Amir Mezer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 943 days.

(21) Appl. No.: 12/079,642

(22) Filed: Mar. 28, 2008

(65) Prior Publication Data

US 2009/0245448 A1 Oct. 1, 2009

(51) Int. Cl.
*H03D 3/24* (2006.01)

(52) U.S. Cl. ........ 375/373; 375/327; 375/324; 375/341; 375/371; 375/375; 455/135; 455/140

(58) Field of Classification Search .................. 375/146, 375/147, 229, 232, 233, 259, 267, 293, 294, 375/316, 322, 343, 347, 350, 354, 355, 362, 375/371, 373, 375
See application file for complete search history.

(56) References Cited

U.S. PATENT DOCUMENTS

| 7,480,224 | B2 * | 1/2009 | Wu et al. ................... 369/59.22 |
| RE40,695 | E * | 4/2009 | Iwamatsu et al. ............. 375/354 |
| 7,885,607 | B1 * | 2/2011 | Narasimhan ............... 455/67.11 |
| 8,005,180 | B2 * | 8/2011 | Fujinuma et al. ............. 375/371 |
| 2006/0050814 | A1 * | 3/2006 | Wu et al. ........................ 375/341 |
| 2006/0164883 | A1 * | 7/2006 | Lablans ................... 365/185.03 |
| 2006/0280240 | A1 * | 12/2006 | Kikugawa et al. ............. 375/229 |
| 2007/0237270 | A1 | 10/2007 | Mezer et al. ................... 375/346 |
| 2008/0310493 | A1 * | 12/2008 | Cohen et al. ................... 375/232 |
| 2010/0061488 | A1 * | 3/2010 | Endres et al. .................. 375/326 |

OTHER PUBLICATIONS

In-Seok Hwang, et al., "Optimization of Baud-Rate Timing Recovery for Equalization," Apr. 2002, pp. 550-552.
U.S. Appl. No. 11/731,232, filed Mar. 30, 2007, entitled "Maintaining Convergence of a Receiver During Changing Conditions," by Amir Mezer.
U.S. Appl. No. 11/729,709, filed Mar. 29, 2007, entitled "Recovering Precoded Data Using a Mueller-Müller Recovery Mechanism," by Ehud Shoor.

* cited by examiner

*Primary Examiner* — Shuwang Liu
*Assistant Examiner* — Hirdepal Singh
(74) *Attorney, Agent, or Firm* — Trop, Pruner & Hu, P.C.

(57) ABSTRACT

A method and apparatus to improve adaptation speed of a digital receiver is presented. The receiver includes an equalizer to initiate adaptation to a transmission channel responsive to a first control signal, a slicer coupled to the equalizer to generate symbol decisions based at least in part on an equalized digital signal, logic to receive the symbol decisions and generate a selection signal when a lock onto a training sequence of the symbol decisions occurs, first and second phase detectors to detect phase errors of the equalized digital signal and an incoming digital signal, respectively, and a clock generator to generate a clock signal responsive to one of the first and second phase errors.

13 Claims, 4 Drawing Sheets

ADAPTATION OF A DIGITAL RECEIVER

BACKGROUND

High speed communication systems capable of higher throughput data rates are emerging. Gigabit Ethernet networks may communicate information at 1 gigabits-per-second (Gbps) or higher over high speed channels. Different Ethernet protocols exist such as those as defined by the Institute of Electrical and Electronics Engineers (IEEE) 802.3 series of standards. For example, a recent protocol is the IEEE Proposed Standard 802.3an titled "IEEE Standard For Information Technology—Telecommunications and information exchange between systems—Local and metropolitan networks—Specific requirements Part 3: Carrier Sense Multiple Access with Collision Detection (CSMA/CD) Access Method and Physical Layer Specifications: Amendment: Physical Layer and Management Parameters for 10 Gb/s Type 10GBASE-T," Draft Amendment P802.3an/Draft 3.1, 2005 ("10GBASE-T Specification"). In addition to Ethernet communication, other communication systems that operate in full duplex mode include digital subscriber lines (DSL) such as asynchronous DSL (ADSL).

These high speed channels typically implement a training or adaptation when beginning operation to enable a receiver to lock to a transmitter. When the receiver begins operation, a sampling phase and frequency is typically adjusted in order to sample the received signal at a phase which provides a suitable eye opening (or small mean square error (MSE) between detected signal and determined symbol). This adjustment, e.g., timing recovery (TR) is done using a control loop that attempts to minimize a measurement of the phase error. The eye opening/MSE can only be measured at the symbol slicer's input after a linear feed-forward equalizer (FFE), so the optimal phase depends on the FFE. Current phase error estimators typically require correct decisions of the symbol slicer.

However, the received signal may require some equalization in order to have an eye opening at all, otherwise the symbol slicer might make wrong decisions. The equalizer starts from an initial estimate using partial information on the transmission channel, and uses an adaptation algorithm (e.g., a least mean square (LMS)) to modify its coefficients in order to minimize the noise power at its output. However, estimating the noise power requires that the symbol slicer make correct decisions, which in turn requires stable phase and frequency locking. Thus a circular dependence exists, and current solutions typically require a long time to perform the adaptation.

DETAILED DESCRIPTION

Embodiments may be used to improve the adaptation speed of a digital receiver that uses equalizer and timing recovery algorithms, and is trained using a pseudo-random series sent from a remote transmitter. In one embodiment, a receiver may include an analog-to-digital converter (ADC), a decision feedback equalizer (which includes a linear feed-forward filter), a digital phase-locked-loop (PLL) that controls the ADC sampling phase, a symbol slicer, a predictor of future symbols, and a controlling state machine. Of course a receiver may include additional components, and other embodiments may be differently configured.

Figure 1:
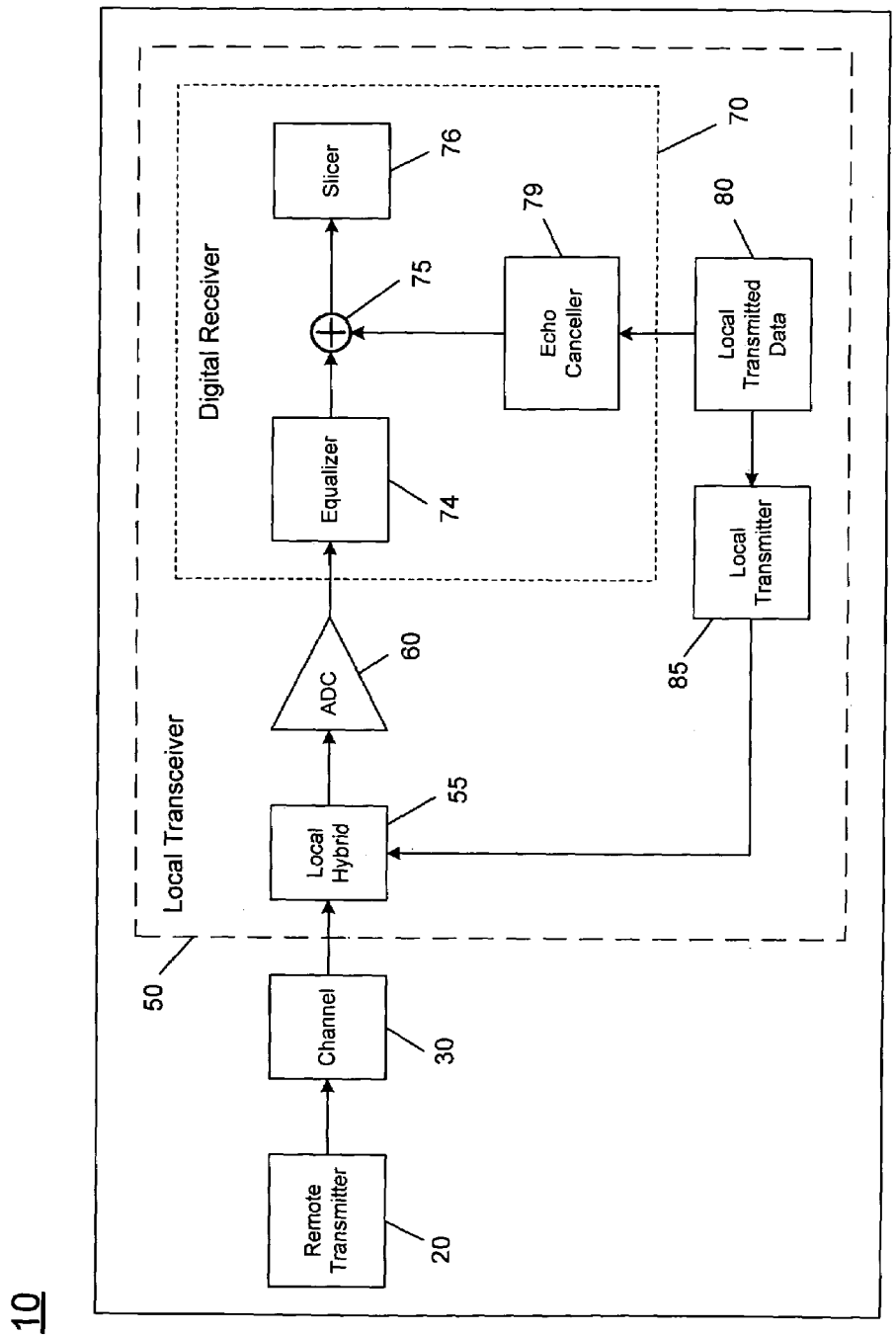
FIG. 1 is a block diagram of a portion of a communication system in accordance with an embodiment of the present invention.

Referring now to FIG. 1, shown is a block diagram of a portion of a communication system in accordance with an embodiment of the present invention. As shown in FIG. 1, system 10 may be a portion of a communication system in which a first system that includes a network interface having a transmitter 20 is coupled through a communication channel 30 to a second system including a network interface having a local transceiver 50. Transmitter 20 may be a transmitter of a physical (PHY) unit that in turn is coupled to a media access control (MAC) unit of the first system (not shown in FIG. 1). Note also that transmitter 20 may be a part of a transceiver that also has receive functions. In various embodiments, channel 30 may be a physical medium that may be, for example, a standard cable such as a Category-6 twisted-pair cable used for Ethernet communication.

Similarly, transceiver 50 may be a portion of a PHY unit of the second system. These network interfaces of the first and second systems may represent any network interface suitable for use with a number of different Ethernet techniques such as an IEEE 802.3an protocol or other digital communication protocol such as an ADSL protocol, although the scope of the present invention is not limited in this regard. During communication between these systems, various channel impairments such as near-end and far-end echo and cross-talk may occur, as well as other channel impairments such as signal attenuation or others due to characteristics of the physical medium.

Figure 2:
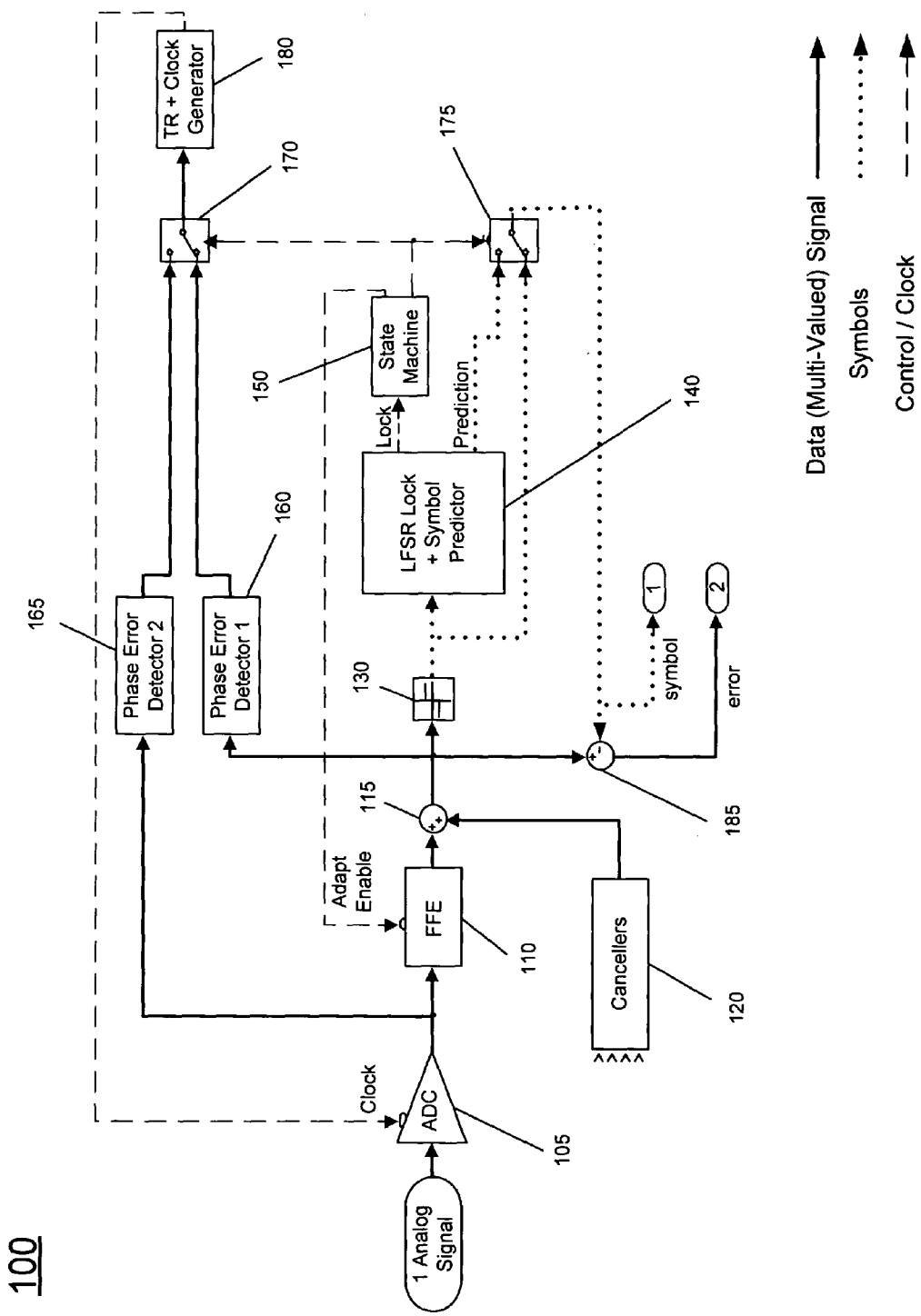
FIG. 2 is a portion of a receiver in accordance with one embodiment of the present invention.

As shown in FIG. 1, transceiver 50 may include a local hybrid switch 55 that is coupled to receive incoming signals from channel 30, as well as local transmitted signals from a transmit path of transceiver 50. Hybrid switch 55 thus enables transmitting and receiving on the same physical medium (e.g., twisted pair) and providing a "received signal" output with a low portion of the "transmitted signal" power. The signals output from local hybrid switch 55 may be provided to an analog-to-digital converter (ADC) 60, which may convert the incoming analog signal to a digital signal. As shown in FIG. 2, digital receiver 70 includes an equalizer 74, which may be, for example, a high pass filter (HPF) such as a finite impulse response (FIR) filter to perform adaptive feed forward equalization (FFE) in order to remove or reduce inter-symbol interference (ISI).

Still referring to FIG. 1, the output of equalizer 74 may be coupled to a summer 75 which sums the equalized signal with an output of a canceller 79. Canceller 79 may be an echo canceller to cancel echo interference from locally transmitted data 80. Summer 75 includes a first input coupled to the output of equalizer 74 and a second input coupled to the output of canceller 79, and acts to sum the input signals to provide an output signal to a slicer 76. Slicer 76 may generate a decision symbol and a slicer error signal as outputs therefrom. A decision symbol may reflect a filtered and/or equalized version of the equalized input signal and may include data to be recovered from the signal received from channel 30. In turn, the slicer error signal may be an error signal to indicate a deviation of the equalizer input signal from a predetermined signal profile for the received input signal. While not shown in the embodiment of FIG. 1, it is to be understood that both of these output signals from digital receiver 70 may be provided to further signal processing circuitry, such as decoding, framing or other circuitry, and on to a MAC unit, for example.

As also shown in FIG. 1, locally transmitted data 80 may pass through a local transmitter 85, which may be a transmit portion of transceiver 80. This signal to be output from transceiver 50 is then provided to local hybrid switch 55. While shown with this particular implementation in the embodiment of FIG. 1, understand that other components such as a PLL, predictor, and control logic may be present in digital receiver 70 to perform adaptation of equalizer 74 using an embodiment of the present invention.

The initial step in performing adaptation in accordance with one embodiment of the present invention is to perform timing recovery with respect to an initial equalizer setting (which should provide some eye opening) in order to lock the sampling frequency. The equalizer cannot adapt at this stage, since it has a non-stationary channel and possibly wrong decisions. Specifically, the equalizer's FFE may itself induce a phase shift; if the phase detector is placed at the slicer's input, the sampling phase achieved in this step is therefore dependent on the initial equalizer setting, and can be optimized only with respect to this setting.

Once the equalizer starts adaptation, the eye starts to open, and the optimal sampling phase within it may change; but when the TR algorithm of a clock generator that provides a sampling clock to a sampler (e.g., ADC 60 of FIG. 1) changes the actual sampling phase, it affects the channel seen by the equalizer, so it affects its adaptation too. If the two mechanisms remain inter-dependent, their joint adaptation is very slow.

Thus embodiments shift to the optimum phase in a quick step, and then let the equalizer adapt to the new phase (which creates a new but stationary channel). To that end, the receiver can use another phase error detector which uses the ADC output (equalizer input) rather than the equalizer output, and is thus independent of the equalizer state. However, changing the sampling phase in a quick step may totally close the receiver's eye such that valid symbols cannot be recovered as data is sampled outside of a width of the data eye and cause wrong decisions, and with wrong decisions, adaptation cannot be performed at all. Embodiments may overcome this problem based on predetermined knowledge of the incoming symbols.

Specifically, on receiver startup, received symbols are part of a cyclic, long pseudo-noise training series, produced by a source such as a linear feedback shift register (LFSR), whose current state can be recovered using a short series of previously-received symbols. The LFSR operation is based upon a known binary polynomial, so once the LFSR state is correctly detected it can be used as a predictor for upcoming symbols. If synchronization between transmitter and receiver is kept, the receiver LFSR state will advance the same way as the transmitter LFSR state, so its predictions will be correct, regardless of the equalizer adaptation. The LFSR prediction can be used for the phase sensor, and also as a known training series for equalizer adaptation. By using a known training series, large adaptation steps and fast convergence can be realized. The adaptation is done using an "error" signal that can be quite large, if the equalizer has to make large phase and magnitude changes; however, this large error can be used safely since the decisions are correct. In other implementations, the training series may not be based on a binary polynomial, but instead be generated by other means. Embodiments can be used with any training series, as long as it enables synchronization and prediction of the next symbols.

In FIG. 2, a portion of a receiver in accordance with one embodiment of the present invention is shown. More specifically, receiver 100 includes an ADC 105 coupled to receive incoming analog signals. ADC 105 is controlled by a sampling clock received from a timing recovery and clock generator (hereafter clock generator) 180, details of which will be described further below. Digitized signals from ADC 105 are provided to FFE 110. In turn, equalized outputs are provided to a summer 115, which is also coupled to receive an output of one or more cancellers 120, such as an echo, inter-symbol interference (ISI) and/or other cancellers. The noise-cancelled output from summer 115 is provided to a slicer 130. In turn, slicer 130, which generates a symbol decision corresponding to a decision for a transmitted symbol and an error signal, which may correspond to a difference between the slicer output and input, is coupled to a LFSR and predictor logic (hereafter logic) 140, which in turn provides a lock output to a state machine 150, which in turn provides selection or control signals to both of a pair of switches 170 and 175, details of which will be described further below. State machine 150 further provides a control signal, namely an adapt enable output to FFE 110.

Still referring to FIG. 2, the output of switch 175, which includes symbol outputs, either from predictor logic 140 or from slicer 130 is provided to a summer 185, which is further coupled to receive the pre-slicer symbol from summer 115. The output of summer 185 thus provides an error signal. The output of switch 175 is thus the symbol output, which can be provided to other circuitry of receiver 100. The symbol output is further provided to a summer 185, where it is subtracted from the noise-cancelled output of summer 115 to thus generate an error signal.

As further shown in FIG. 2, the output of summer 115 is further coupled to a first phase error detector 160, which can detect a phase error value of the input to detector 160. This phase error is provided to switch 170, along with the output of a second phase error detector 165. As shown in FIG. 2, the pre-equalized digitized signal from ADC 105 is directly provided to second phase error detector 165. Note that a clock generator 180 that is part of a PLL path receives the output of switch 170, which may be the phase error output from either of phase error detectors 160 and 165. Based on this phase error value, clock generator 180 generates the clock signal that acts as a sampling clock signal for ADC 105. State machine 150 thus acts to control the selective switching of switches 170 and 175. While shown with this particular implementation in the embodiment of FIG. 2, the scope of the present invention is not limited in this regard.

In one embodiment, adaptation may occur as follows. First a TR algorithm starts using a first phase error detector which uses the equalizer's output, with an initial equalizer setting. However, no equalizer adaptation is performed. The TR adjusts the ADC clock phase and frequency to minimize the phase error. The predictor is bypassed, so the slicer output is chosen as detected symbols (to set the receiver's LFSR, as input to the phase error detectors and ISI canceller, and to generate a slicer error signal). The receiver remains in this state until the LFSR is locked, which may occur when the LFSR makes correct predictions for some time, e.g., a time period equivalent to a few hundred received symbols (e.g., approximately one microsecond (μs) in a 10GBASE-T system).

Once the LFSR is locked, its predicted symbols are chosen as detected symbols, and the TR also switches to a second phase error detector, which uses the ADC output and is independent of the FFE setting. Accordingly, the second phase detector achieves its chosen sampling phase quickly (e.g., on the order of approximately a few thousand symbols, e.g., approximately 10 μs and 100 μs). Next the FFE starts adaptation in order to open the eye (minimize the mean square error) at the new sampling phase. When the MSE is low enough, the LFSR predictor can be disabled and slicer output used again. From this point, receiver adaptation is complete and the receiver is ready to detect actual data.

Thus by using a pair of phase error detectors, the drawbacks of a single detector can be avoided. For example, only using a post-FFE detector causes very slow equalizer and sampling phase adaptation, due to the inter-dependence of the sampling phase (or its error estimate) with the FFE setting. However, it allows synchronization with the LFSR without knowing its initial state, assuming the eye opening can be made large enough to detect symbols. Using only a pre-FFE detector enables fast equalizer adaptation, but requires initial knowledge of the received symbols (synchronization with the transmitter LFSR). This is not always feasible if the sequence length is large. Using both detectors at the different stages allows the benefits of both, without the limitations of either of the detectors. Embodiments thus combine the usage of two timing sensors, where one is used to bootstrap the other. The LFSR acts as a link between the two sensors. The post-FFE sensor enables usage of the LFSR, and the LFSR enables usage of the pre-FFE sensor.

Figure 3:
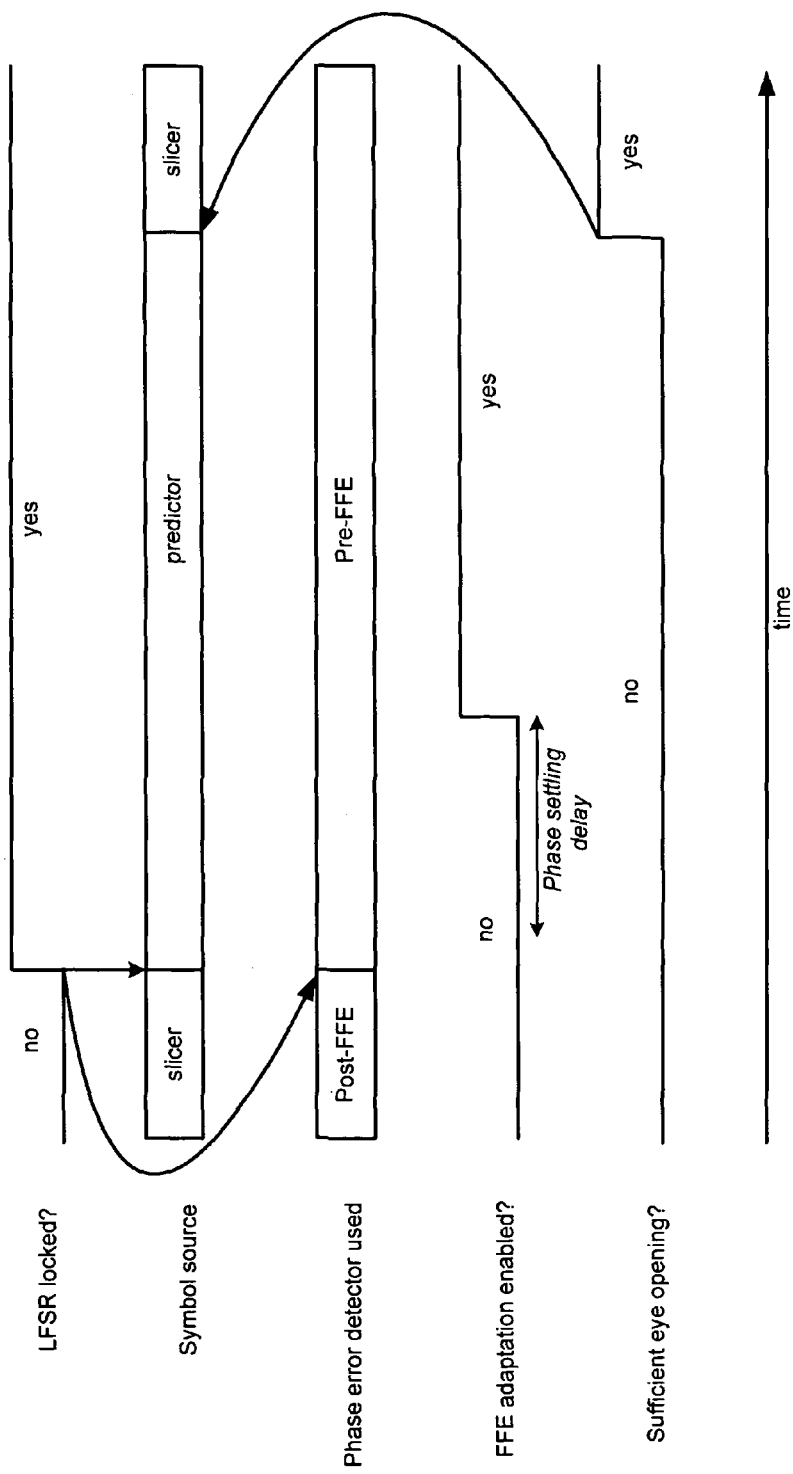
FIG. 3 is a timing diagram of an adaptation method in accordance with one embodiment of the present invention.

Referring now to FIG. 3, shown is a timing diagram of an adaptation method in accordance with one embodiment of the present invention. As shown in FIG. 3, various control signals may be generated, e.g., in a state machine such as state machine 150 of FIG. 2, to control various receiver components during adaptation. Specifically, as shown in FIG. 3, it may be determined whether a receiver LFSR has locked. For example, with reference back to FIG. 2, state machine 150 may determine whether LFSR (of predictor 140) is locked, based on whether a lock signal has been received in state machine 150. If not, the source of symbols that is provided by switch 175 (as shown in FIG. 2) is set as being from slicer 130. Accordingly, as shown in FIG. 2, the output of slicer 130 is directly coupled to the lower input of switch 175, which is controlled to thus select that signal for output from switch 175. Similarly, when the LFSR is not locked, the phase error detector used to generate a clock signal when the clock signal is the post-FFE detector, namely first detector 160 (as shown in FIG. 2).

Referring still to FIG. 3, after the LFSR is locked, the state machine may switch control of both switches 170 and 175 (in the embodiment of FIG. 2) to thus cause the symbols from predictor 140 to be output from switch 175, while phase error signals from phase error detector 165 are output from switch 170 and used to generate a clock in clock generator 180. When a sufficient eye opening is realized such that correct symbol decisions may be made using incoming data, the symbol source may revert back to the slicer (via control of switch 175 in FIG. 2). Accordingly, using an adaptation method in accordance with an embodiment of the present invention, first the LFSR is allowed to lock onto an incoming training sequence of predetermined symbols in which output signals are obtained from the slicer itself and phase error detection is based on a post-FFE value, while after the LFSR locks and a phase settling delay occurs, the state machine may enable the FFE 110 for adaptation.

Figure 4:
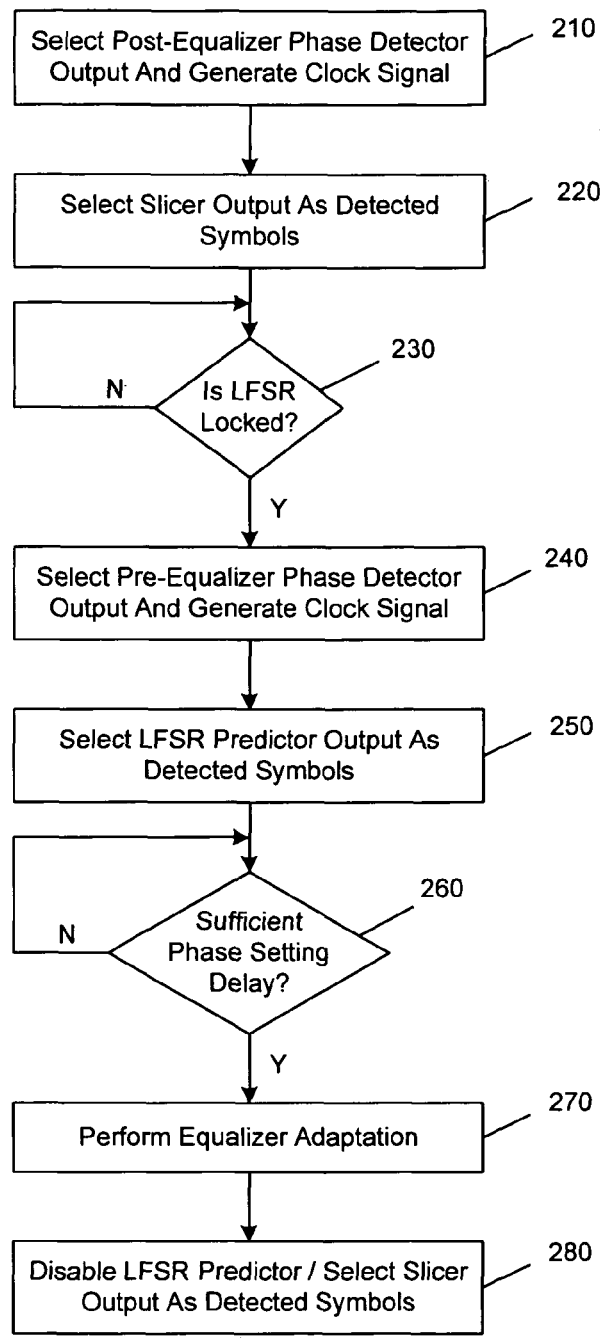
FIG. 4 is a flow diagram of a method in accordance with an embodiment of the present invention.

Referring now to FIG. 4, shown is a flow diagram of a method in accordance with an embodiment of the present invention. As shown in FIG. 4, method 200 may be used to perform adaptation of a receiver and in one embodiment may be implemented in state machine 150. Method 200 may begin by selecting a post-equalizer phase detector output and generating a clock signal using the phase error signal from the post-equalizer phase detector (block 210). As described above, in some implementations a state machine may control a switch to provide this phase detector output to a timing recovery and clock generator. However, other implementations are possible. Next, a slicer output may be selected as the source of detected symbols (block 220). Similarly, the same state machine may control another switch to provide a slicer output for use as detected symbols.

Still referring to FIG. 4, next it may be determined whether an LFSR, e.g., of predictor logic is locked onto the incoming signal information (diamond 230). More specifically, it may be determined whether the LFSR has locked onto a training series. If not, diamond 230 waits until the LFSR has locked. When the LFSR has locked, control passes to block 240. At block 240, a pre-equalizer phase detector output may be selected and the clock signal may be generated using this phase detector error. More specifically, after locking, a phase detector output from a phase detector that receives its input before equalization may be passed to the timing recovery and clock generator for the clock generator to thus generate a clock signal to control the sampling frequency and phase of the front end ADC.

At block 250, the LFSR predictor output may be selected as the detected symbol source. Control then passes to diamond 260 to determine whether a sufficient phase settling delay has occurred. When this delay period has completed, control passes to block 270 where equalizer adaptation may be performed. Thus the equalizer may be adapted to open the eye at the new sampling phase. When the equalizer has completed adaptation, namely when the error output is sufficiently low, control passes to block 280 where the LFSR predictor may be disabled and the slicer output may be selected as the source of detected symbols. Accordingly, at this time normal receiver operation may begin. While shown with this particular implementation in the embodiment of FIG. 4, the scope of the present invention is not limited in this regard.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   an equalizer to receive an incoming digital signal based on an incoming analog signal from a transmission channel and to output an equalized digital signal, the equalizer to initiate adaptation to the transmission channel responsive to a first control signal;
   a slicer coupled to the equalizer to generate symbol decisions based at least in part on the equalized digital signal;

a first logic coupled to receive the symbol decisions from the slicer, the first logic to generate a lock signal when the first logic has locked onto a training sequence of the symbol decisions;

a second logic coupled to the first logic to receive the lock signal and to generate a first selection signal responsive thereto, wherein the second logic is to generate the first control signal after receipt of the lock signal and a phase settling delay, and generate a second selection signal to select an output of the slicer or an output of the first logic as a symbol source;

a first phase detector to detect a first phase error of the equalized digital signal;

a second phase detector to detect a second phase error of the incoming digital signal; and a clock generator to generate a clock signal responsive to the first phase error or the second phase error, wherein the clock generator is to receive the first or second phase error responsive to the first selection signal.

2. The apparatus of claim 1, wherein the first logic is to further generate predicted symbols after the first logic has locked onto the training sequence.

3. The apparatus of claim 2, wherein the first logic includes a linear feedback shift register (LFSR) and a predictor to generate the predicted symbols.

4. The apparatus of claim 1, wherein the second logic is to generate the first selection signal to select the first phase error and the second selection signal to select the slicer output as the symbol source before adaptation of the equalizer has been initiated.

5. The apparatus of claim 4, wherein the second logic is to generate the first selection signal to select the second phase error and the second selection signal to select a prediction output from the first logic as the symbol source during the equalizer adaptation, and to thereafter generate the second selection signal to select the slicer output as the symbol source after adaptation of the equalizer has been completed.

6. The apparatus of claim 1, further comprising an analog-to-digital converter (ADC) to receive the incoming analog signal from the transmission channel and convert the incoming analog signal into the incoming digital signal, wherein the ADC is clocked by the clock signal.

7. A method comprising:

equalizing an incoming signal from a transmission channel in an equalizer before the equalizer has been adapted to the transmission channel, and outputting an equalized digital signal therefrom;

generating symbol decisions based at least in part on the equalized digital signal in a slicer coupled to the equalizer;

receiving the symbol decisions in a first logic and generating a lock signal when the first logic has locked onto a training sequence of the symbol decisions;

receiving the lock signal in a second logic coupled to the first logic and generating a first selection signal responsive thereto;

detecting a first phase error of the equalized digital signal in a first phase detector;

detecting a second phase error of the incoming digital signal in a second phase detector;

receiving the first phase error or the second phase error and generating a clock signal responsive thereto, wherein the first or second phase error is received based on the first selection signal; and generating a first control signal to initiate adaptation of the equalizer after receipt of the lock signal and a phase settling delay, and generating a second selection signal to select an output of the slicer or an output of the first logic as a symbol source, and generating the first selection signal to select the first phase error and the second selection signal to select the slicer output as the symbol source before adaptation of the equalizer has been initiated.

8. The method of claim 7, further comprising generating predicted symbols in the first logic after the first logic has locked onto the training sequence.

9. The method of claim 8, further comprising locking onto the training sequence using a linear feedback shift register (LFSR) and generating the predicted symbols using a predictor.

10. The method of claim 7, further comprising generating the first selection signal to select the second phase error, generating the second selection signal to select a prediction output from the first logic as the symbol source during the equalizer adaptation, and thereafter generating the second selection signal to select the slicer output as the symbol source after adaptation of the equalizer has been completed.

11. An apparatus comprising:

an equalizer to receive an incoming digital signal based on an incoming analog signal from a transmission channel and to output an equalized digital signal, the equalizer to initiate adaptation to the transmission channel responsive to a first control signal;

a slicer coupled to the equalizer to generate symbol decisions based at least in part on the equalized digital signal;

a predictor logic coupled to receive the symbol decisions from the slicer, the predictor logic to generate a lock signal when the predictor logic has locked onto a training sequence of the symbol decisions and to generated predicted symbols after locking onto the lock signal;

a state machine coupled to the prediction logic to receive the lock signal and to generate a first selection signal responsive thereto and to generate a second selection signal to select an output of the slicer or an output of the predicted logic as a symbol source;

a first phase detector to detect a first phase error of the equalized digital signal;

a second phase detector to detect a second phase error of the incoming digital signal; and a clock generator to generate a clock signal responsive to the first phase error or the second phase error, wherein the clock generator is to receive the first or second phase error responsive to the first selection signal.

12. The apparatus of claim 11, wherein the state machine is to generate the first control signal after receipt of the lock signal and a phase settling delay.

13. The apparatus of claim 12, wherein the state machine is to generate the first selection signal to select the first phase error and the second selection signal to select the slicer output as the symbol source before adaptation of the equalizer has been initiated.

* * * * *